United States Patent
Maehara

[19]

[11] Patent Number: 6,131,711
[45] Date of Patent: Oct. 17, 2000

[54] DUO-SERVO DRUM BRAKE

[75] Inventor: Toshifumi Maehara, Saitama, Japan

[73] Assignee: Akebono Brake Industry Co., Ltd., Tokyo, Japan

[21] Appl. No.: 09/096,537

[22] Filed: Jun. 12, 1998

[30] Foreign Application Priority Data

Jun. 13, 1997 [JP] Japan ................................ 9-157023
Jun. 13, 1997 [JP] Japan ................................ 9-157024

[51] Int. Cl.$^7$ .................................................. F16D 51/00
[52] U.S. Cl. .......................................... 188/331; 188/342
[58] Field of Search .................................. 188/340, 342, 188/74, 325, 331, 332, 330, 328, 329; 192/76

[56] References Cited

U.S. PATENT DOCUMENTS

| | | | |
|---|---|---|---|
| 1,846,024 | 2/1932 | Chase et al. ........................... | 188/336 |
| 1,981,939 | 11/1934 | Andres .................................... | 188/331 |
| 2,167,706 | 8/1939 | Berno ...................................... | 188/331 |
| 4,546,862 | 10/1985 | Shellhause .............................. | 188/331 |

*Primary Examiner*—Robert J. Oberleitner
*Assistant Examiner*—Lan Nguyen
*Attorney, Agent, or Firm*—Morgan, Lewis & Bockius LLP

[57] ABSTRACT

Counter braking force acting on a secondary shoe is input to one end portion of a control lever supported with an anchor pin vertically provided on a backing plate in such a manner that the control lever is capable of swinging. An inner end portion in the radial direction of the control lever engages with a strut for pressing a primary shoe against a brake drum. Pressing force A with which the strut is pressing the primary shoe against the brake drum is drastically reduced when braking force, that is, the counter braking force increases and slightly reduced when the braking force, that is, the counter braking force decreases, whereby an increase or a decrease in the braking force is made automatically controllable.

1 Claim, 4 Drawing Sheets

DUO-SERVO DRUM BRAKE

BACKGROUND OF THE INVENTION

The present invention relates to a duo-servo drum brake for vehicles and more particularly to a technique of stabilizing variation in braking force of a duo-servo drum brake which is mechanically operated.

Various types of drum brakes have heretofore been employed for controlling the traveling of vehicles. These drum brakes are classified into the following: a leading trailing type; a two leading type; a duo-servo type and so forth, depending on the arrangement of brake shoes which are pressed against the inner peripheral surface of a drum.

Of these types of drum brakes, the duo-servo drum brake is generally equipped with two brake shoes disposed opposite to each other; namely, a primary shoe and a secondary shoe. The primary shoe has an input portion on its rearward side in the direction in which the drum is rotated forward and is connected to the rearward side of the secondary shoe via an adjuster. Further, the forward side of the secondary shoe is brought into contact with an anchor pin mounted on a backing plate, so that counter braking force acting on the primary and secondary shoes is received by the anchor pin.

When the primary and secondary shoes are thus expanded and pressed against the inner peripheral surface of the drum, the counter braking force acting on the primary shoe is input to the rearward side of the secondary shoe to press the secondary shoe against the drum, whereby the primary and secondary shoes simultaneously function as a leading shoe and make available braking force having an extremely high gain.

In comparison with those of the leading trailing type and the two leading type, the aforesaid duo-servo drum brake has various advantages in that extremely high braking force is obtainable and that it can be made compact and incorporated as a parking brake. On the other hand, there still exist problems arising from not only its sensitiveness to variation in the friction coefficient of lining of the brake shoe but also difficulty in stabilizing braking force.

SUMMARY OF THE INVENTION

An object of the present invention intended to solve the foregoing problems is to provide a mechanically-operated duo-servo drum brake so improved as to stabilize braking force with simple construction.

In order to accomplish the object above, a duo-servo drum brake according to the present invention comprises: a primary shoe and a secondary shoe which are disposed opposite to each other inside a brake drum, counter braking force acting on the primary shoe being used for pressing the secondary shoe against the brake drum; and an anchor pin disposed forward further than the secondary shoe in the direction in which the brake drum is rotated forward and used for receiving the counter braking force, further includes:

a shoe expanding mechanism having a first link for pressing the primary shoe against the brake drum and a second link for pressing the secondary shoe synchronously when the first link presses the primary shoe;

a control lever which is held around the anchor pin and when its end portion on one side receives counter braking force acting on the secondary shoe, its end portion on the other side is capable of swinging around the anchor pin in the direction of the secondary shoe;

a balance link which is pivotally supported with the secondary shoe in a manner capable of swinging, has a contact surface in one end portion with the other end portion of the control lever and a contact surface in the other end portion with the pressing portion of the second link, and swings when the pressing force received with the contact surface in the one end portion from the control lever exceeds the pressing force received with the contact surface in the other end portion from the second link; and a projected portion which is provided for the first link and when the other end portion of the control lever is displaced toward the secondary shoe after swinging the balance link, engages with the secondary shoe in order to reduce the pressing force of the first link.

More specifically, when the counter braking force acting on the secondary shoe in the duo-servo drum brake according to the present invention is input to the end portion on one side of the control lever, control force resulting from multiplying the counter braking force by the lever ratio of the control lever is generated in the end portion on the other side of the control lever.

When the pressing force (control force) received by one end of the balance link from the control lever becomes greater than the pressing force received by the other end of the balance link from the second link, the balance link swings and the other end portion of the control lever is displaced toward the secondary shoe.

When the other end portion of the control lever is further displaced toward the secondary shoe, the other end portion thereof engages with the first link, which reduces the pressing force with which the first link is pressing the primary shoe against the brake drum.

Thus, the first link automatically decreases the pressing force with which the first link is pressing the primary shoe against the brake drum when the counter braking force acting on the secondary shoe, that is, the braking force derived from the duo-servo drum brake according to the present invention exceeds a predetermined level, whereby the braking force derived from the primary shoe is reducible.

When the braking force derived from the primary shoe is reduced, the pressing force applied to the rearward side of the secondary shoe is also reduced and the overall braking force is simultaneously reduced.

Therefore, since the braking force can automatically be reduced when the braking force exceeds the predetermined value according to the present invention, a duo-servo drum brake which is mechanically actuated and offers stable braking force is obtainable.

In another aspect of the invention, a duo-servo drum brake comprises: a primary shoe and a secondary shoe which are disposed opposite to each other inside a brake drum, counter braking force acting on the primary shoe being used for pressing the secondary shoe against the brake drum; and an anchor pin disposed forward further than the secondary shoe in the direction in which the brake drum is rotated forward and used for receiving the counter braking force, further including:

a strut for pressing the primary shoe against the brake drum as an operating lever pivots; and a control lever which is capable of swinging around the anchor pin and whose end portion on one side is brought into contact with the secondary shoe and whose end portion on the other side is brought into engagement with the strut, characterized in that when the end portion on one side of the control lever receives predetermined counter braking force from the secondary shoe, the end portion on the other side of the control lever urges the strut in a direction opposite to the direction in which the primary shoe of the strut is pressed in cooperation with the anchor pin.

More specifically, in a duo-servo drum brake according to the present invention, part of the counter braking force acting on the secondary shoe is reversely input to the strut for pressing the primary shoe against the brake drum at a ratio corresponding to the lever ratio centering on the anchor pin of the control lever. Consequently, the pressing force with which the strut is pressing the primary shoe against the brake drum is drastically reduced and the braking force is also reduced when the braking force increases to about a predetermined value because of servo action. When the braking force decreases, the pressing force with which the strut is pressing the primary shoe against the brake drum is slightly reduced and the braking force is recovered.

Therefore, since the braking force can automatically be reduced to the desired level according to the present invention, a duo-servo drum brake which is mechanically actuated and offers stable braking force is obtainable.

DETAILED DESCRIPTION OF THE INVENTION

A detailed description will subsequently be given of a duo-servo drum brake as a first embodiment of the invention with reference to FIGS. 1 and 2.

Figure 1:
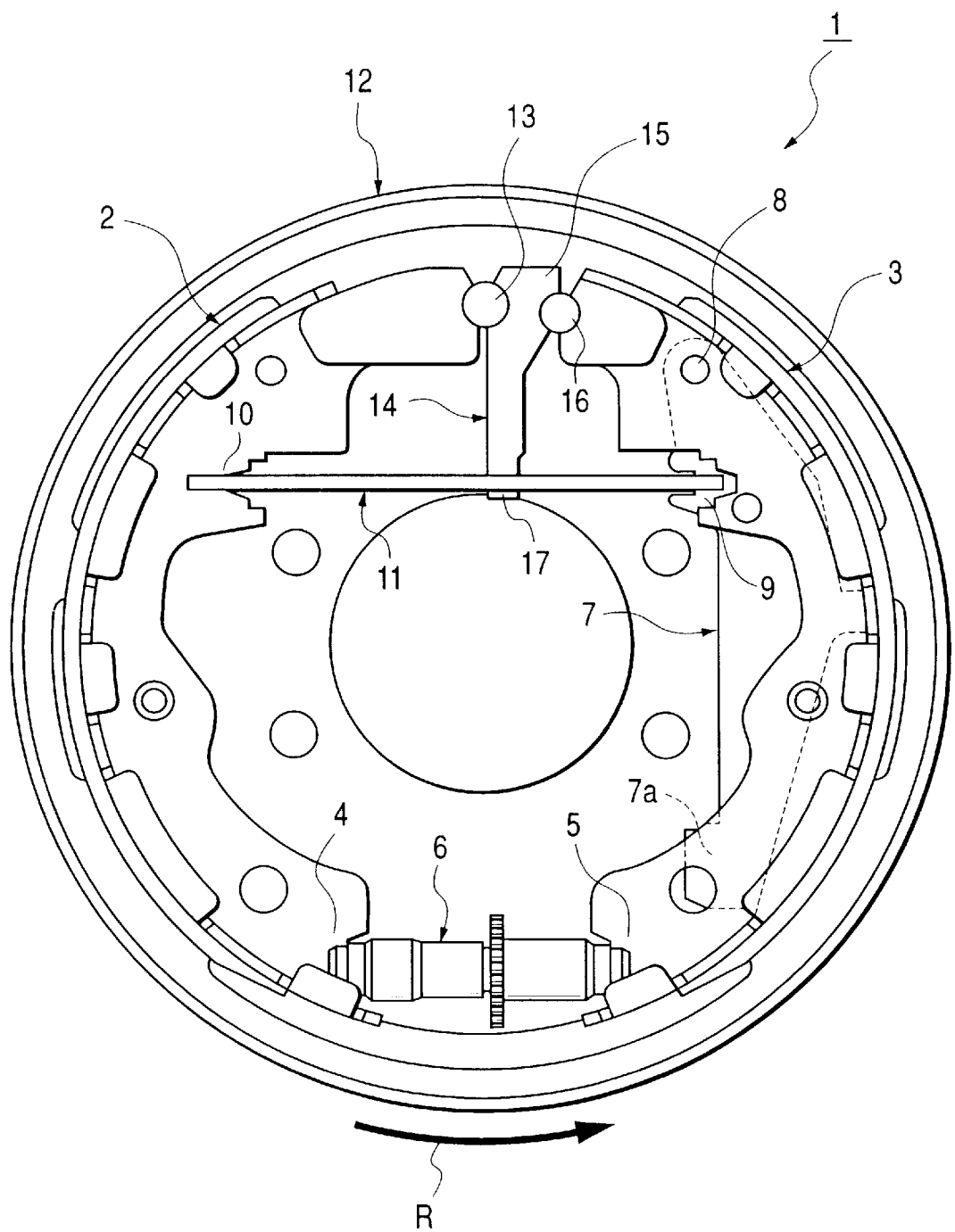
FIG. 1 is a schematic elevational view of the overall structure of a duo-servo drum brake embodying the present invention.
Figure 2:
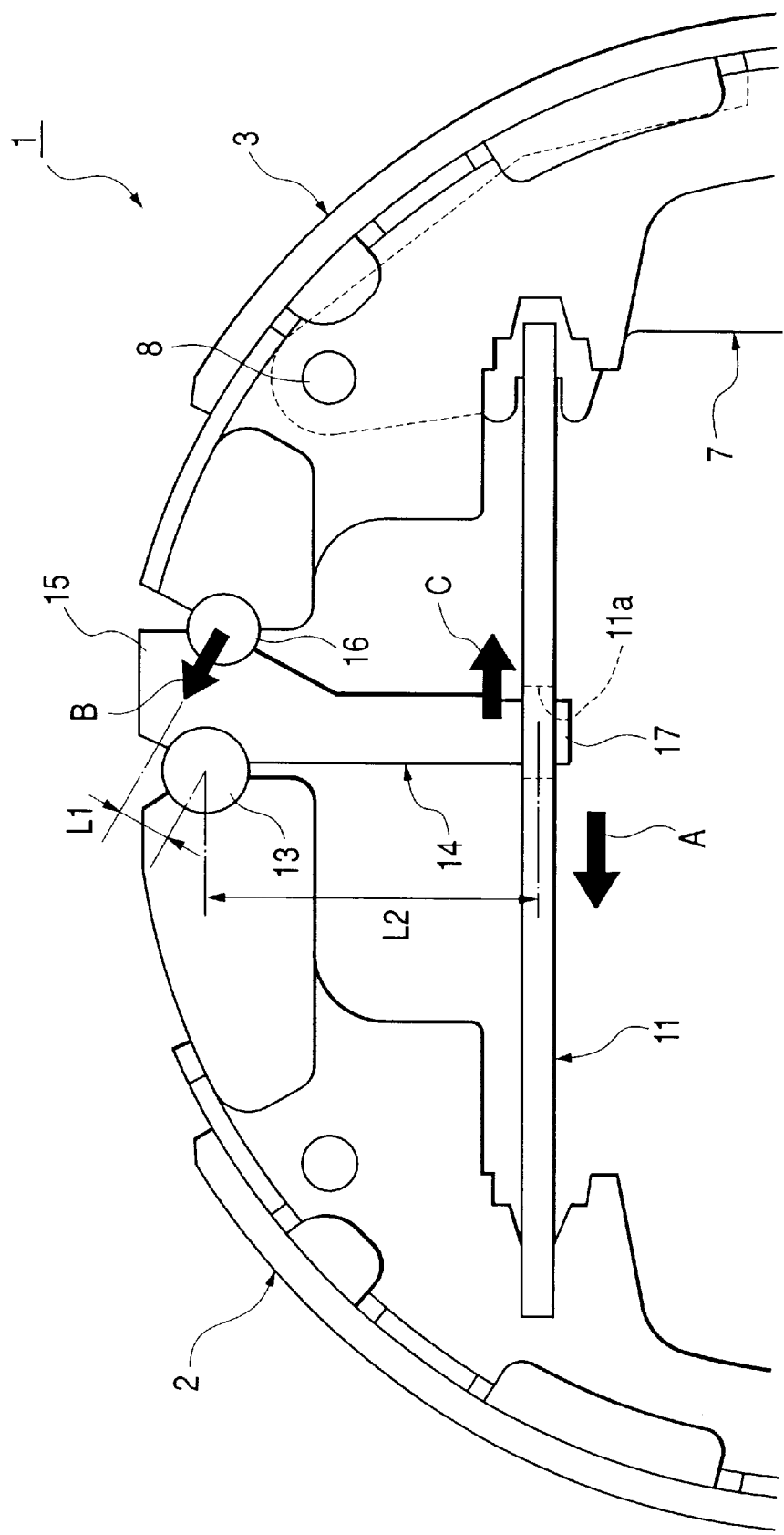
FIG. 2 is a schematic elevational view illustrative of the operation of each member shown in FIG. 1.

FIG. 1 is a schematic elevational view of the overall structure of a duo-servo drum brake embodying the present invention; and FIG. 2, a schematic elevational view illustrative of the operation of each member shown in FIG. 1.

In the following description, the forward side in the direction in which a brake drum is rotated forward is simply called the "forward side," and rearward side in the direction in which the brake drum is rotated forward is simply called "rearward side."

A description will first be given of the overall structure of a duo-servo drum brake according to this embodiment of the invention with reference to FIG. 1.

A duo-servo drum brake 1 according to this embodiment of the invention is equipped with a brake drum (not shown) which is rotated forward counterclockwise as shown by an arrow R in FIG. 1. In the brake drum are a primary shoe 2 and a secondary shoe 3 which are disposed opposite to each other.

Further, an adjuster 6 for adjusting the clearance between the sliding surfaces of these brake shoes and the brake drum is held between the forward-side end portion 4 of the primary shoe 2 and the rearward-side end portion 5 of the secondary shoe 3.

Thus, counter braking force acting on the primary shoe 2 is input to rearward side of the secondary shoe 3 via the adjuster 6 and used to press the secondary shoe 3 against the brake drum.

In other words, both primary and secondary shoes 2, 3 in the duo-servo drum brake 1 according to this embodiment of the invention operate as leading shoes.

On the other hand, a lever 7 for radially expanding the primary shoe 2 and the secondary shoe 3 outward and pressing them against the brake drum is supported with a support shaft 8 mounted on the forward side of the secondary shoe 3 in such a manner that it can swing back and forth.

Moreover, both end portions of a strut 11 for pressing the primary shoe 2 against the brake drum as the lever 7 pivots are made to engage with an engaging portion 9 provided on the support shaft side 8 of the lever 7 and an engaging portion 10 provided on the rearward side of the primary shoe 2, respectively.

The basic arrangement of the lever 7 and the strut 11 is similar to that of a conventional parking brake.

An anchor pin 13 is perpendicularly installed on a backing plate 12 fitted with the expandable primary and secondary shoes 2, 3 in a forward side portion further than the secondary shoe 3. Further, a control lever 14 is mounted on the anchor pin 13 in such a manner that it can swing on a plane parallel to the backing plate 12.

Further, the control lever 14 is a member in the form of a thick plate extending in parallel to the surface of the backing plate 12, and the forward-side end portion of the secondary shoe 3 is brought into contact with the outer end portion 15 in the radial direction via a counter-braking-force transmitting pin 16. The inner end portion 17 in the radial direction of the control lever 14 is fitted into a through-hole 11a bored in the central portion in the longitudinal direction of the strut 11 and mated with the strut 11 in the longitudinal direction.

The operation of the aforesaid duo-servo drum brake 1 thus constructed according to this embodiment of the invention will be described by reference to FIG. 2.

In order to operate the duo-servo drum brake 1 according to this embodiment of the invention, the swinging end 7a of the lever 7 is pulled by means of a brake cable, for example, and displaced inward in the radial direction of the brake drum.

Then the lever 7 swings with the support shaft 8 as a fulcrum so as to displace the strut 11 toward the primary shoe 2. As the lever 7 is simultaneously caused to swing with the engaging portion 9 as a fulcrum, the support shaft 8 is radially displaced outward. Thus, the forward-end portion of the secondary shoe 3 is radially displaced outward by the support shaft 8 and pressed against the brake drum.

In consequence, the primary and secondary shoes are expanded and pressed against the brake drum so as to put a brake on the rotating brake drum.

At this time, the counter force of the braking force put by the primary shoe 2 on the rotating brake drum is input to the rearward side of the secondary shoe 3 via the adjuster 6. Therefore, the greater the braking force of the primary shoe 2 becomes, the stronger the secondary shoe 3 is pressed against the brake drum; thus, the braking force of the secondary shoe 3 is increased.

On the other hand, the control lever 14 is swung around the anchor pin 13 counterclockwise as shown in FIG. 2 because of counter braking force B acting on the secondary shoe 3.

When the inside of the end portion 17 in the radial direction of the control lever 14 is swung in a position where it fits into the through-hole 11a of the strut 11, control force C resulting from multiplying the counter braking force B by the lever ratio (L1/L2) of the control lever 14 is loaded on the side opposite to the direction in which the strut 11 presses the primary shoe 2.

When the braking force derived from the primary and secondary shoes 2, 3 is changed to the direction in which it increases even while the operating force of the lever 7 for operating the brake is held constant, the control force C that the control lever 14 loads on the strut 11 is also increased as the counter braking force B acting on the control lever 14 is increased.

Since pressing force A with which the strut 11 is pressing the primary shoe 2 against the brake drum is drastically decreased, the braking force of the primary shoe 2 is reduced. Then the counter braking force acting on the primary shoe 2 is reduced and consequently the pressing force with which the secondary shoe 3 is pressed against the brake drum is also reduced, whereby the braking force derived from the secondary shoe 3 is also lowered.

When the braking force derived from the primary and secondary shoes 2, 3 is changed to the direction in which it decreases, the control force C that the control lever 14 loads on the strut 11 is also decreased as the counter braking force B acting on the control lever 14 is decreased.

Since the pressing force A with which the strut 11 is pressing the primary shoe 2 against the brake drum is thus decreased only slightly, the braking force of the primary shoe 2 is increased. As the counter braking force acting on the primary shoe 2 is increased, the pressing force with which the secondary shoe 3 is pressed against the brake drum is increased and the braking force derived from the secondary shoe 3 is also increased.

In other words, the brake is prevented from effecting too much to ensure that stable braking force is obtainable since an increase or a decrease in the braking force derived from the primary and secondary shoes 2, 3 is controllable so that the increase or the decrease therein can automatically be set at about a desired value even while the operating force of the lever 7 for operating the brake is held constant in the duo-servo drum brake 1 according to this embodiment of the invention.

The intensity of the control force C with which the control lever 14 acts on the strut 11, that is, the gain of suppressing variations in the increase or decrease of the braking force derived from the primary and the secondary shoes 2, 3 can be adjusted by properly varying the value of the dimension L1 between the point of action of the counter braking force acted by the secondary shoe 3 on the control lever 14 and the center of the anchor pin 13.

Although a detailed description has been given of an embodiment of the duo-servo drum brake 1 according to the present invention, the invention is not limited to the aforesaid embodiment thereof but may needless to say be modified in various manners.

In the aforesaid mode for carrying out the invention, for example, the configuration of the control lever 14 may be changed, so that the strut 11 and primary shoe 2 are made to engage with each other by holding the end portion of the control lever 14 between the strut 11 and the primary shoe 2 instead of passing the leading end of the control lever 14 through the through-hole bored in the longitudinal central portion of the strut 11.

Figure 3:
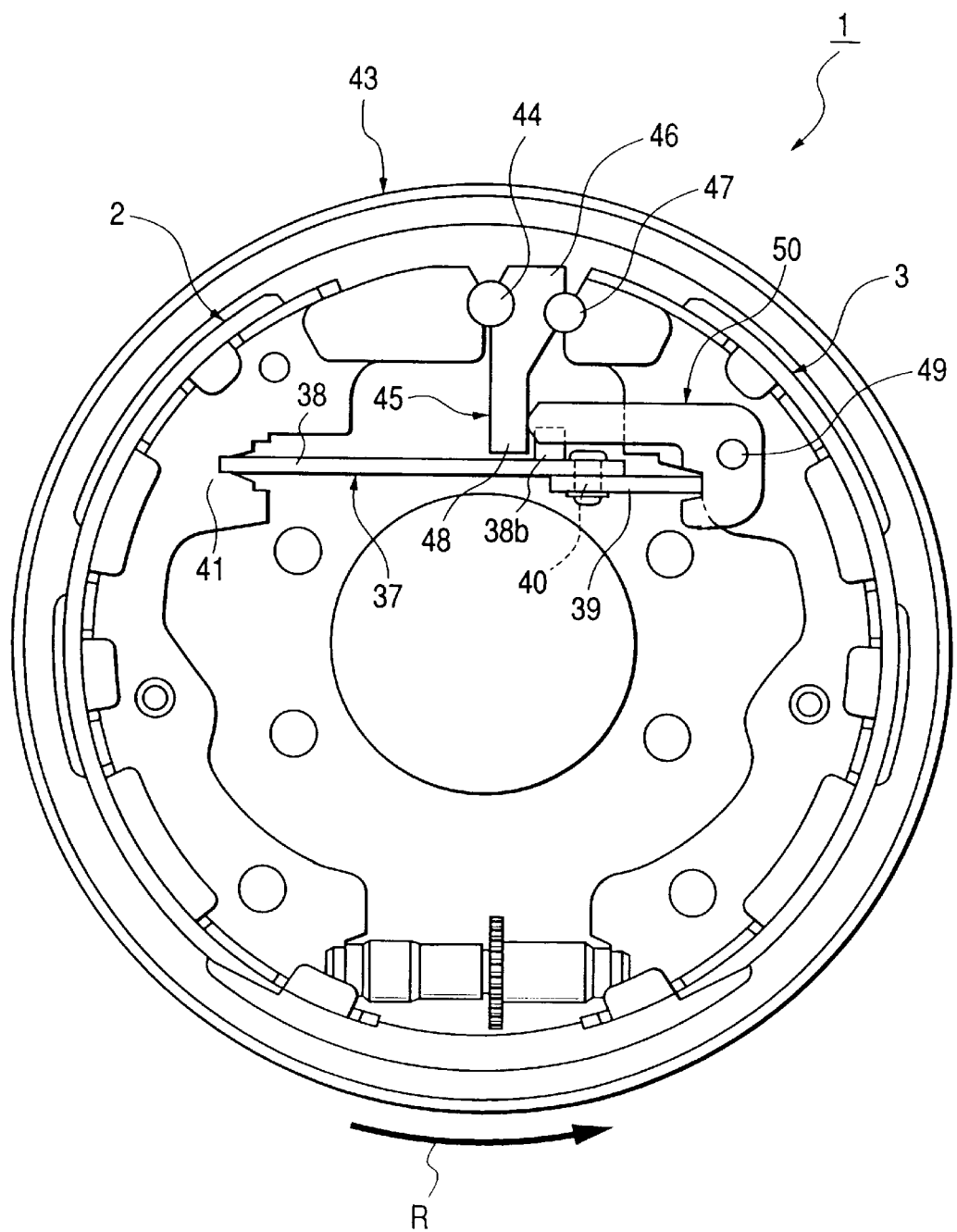
FIG. 3 is a schematic elevational view of the overall structure of another duo-servo drum brake embodying the present invention.
Figure 4:
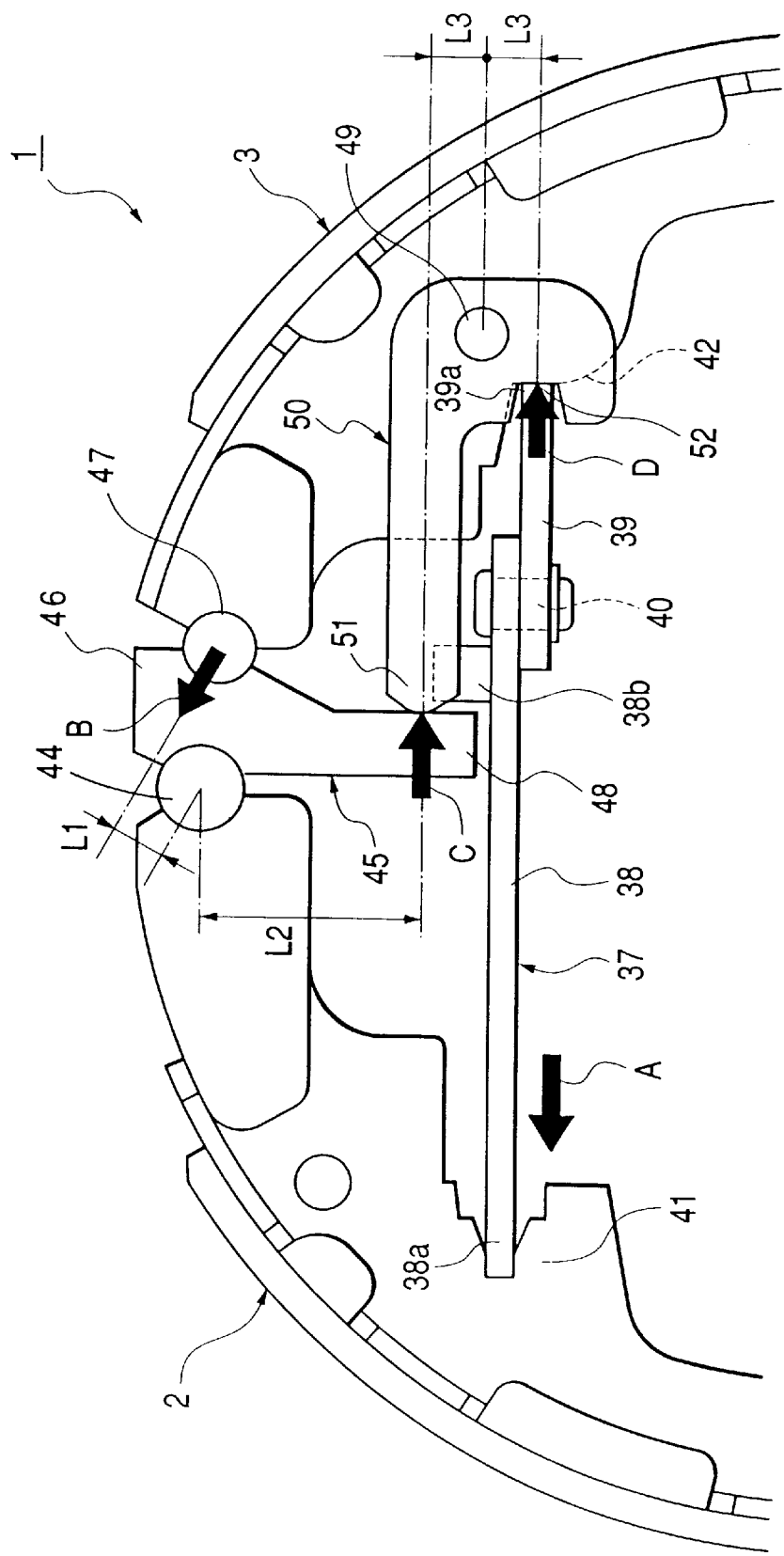
FIG. 4 is a schematic elevational view illustrative of the operation of each member shown in FIG. 3.

Referring to FIGS. 3, 4, there is given a detailed description of a second embodiment of the duo-servo drum brake according to the present invention.

FIG. 3 is a schematic elevational view of the overall structure of a duo-servo drum brake embodying the present invention; and FIG. 4, a schematic elevational view illustrative of the operation of each member shown in FIG. 3, wherein like reference numerals designate like members shown in FIGS. 1, 2.

A description will be given of the schematic overall structure of the duo-servo drum brake according to this embodiment of the invention by reference to FIG. 3 first.

In the second embodiment of the invention, a shoe expanding mechanism 37 for radially expanding the primary shoe 2 and the secondary shoe 3 outward and pressing both of them against a drum is held between the primary and secondary shoes 2, 3.

The shoe expanding mechanism 37 is such that a first and a second link 38, 39 in the form of a batten are flexibly and alternately connected together via a support shaft 40 in side elevation, the leading end 38a of the first link 38 engaging with an engaging portion 41 formed on the primary shoe 2, the leading end 39a of the secondary shoe 3 engaging with an engaging portion 42 formed on the secondary shoe 3.

Thus, the space between the leading ends 38a, 39a of both links 38, 39 is widened when the support shaft 40 is moved closer to a backing plate 43 by operating a brake cable, for example, and the primary and secondary shoes 2, 3 are radially expanded outward before being pressed against the drum.

Any arrangement other than the shoe expanding mechanism 37 is applicable in this case as long as the primary and secondary shoes 2, 3 are radially expandable outward.

The forward-side end portion of the secondary shoe 3 is brought into contact with the outer end portion (end portion on one side) in the radial direction of the control lever 45 via a counter-braking-force transmitting pin 47.

A substantially L-shaped balance link 50 formed of a thick plate is mounted on a support shaft 49 mounted on the secondary shoe 3 in such a manner that it can swing on a plane parallel to the side face of the backing plate 43. Further, the front-end contact surface of the substantially L-shaped long-side portion is brought into contact with the other end portion 48 of the control lever, and an engaging recessed portion 52 as the other end portion formed in the substantially short-side portion thereof as a contact surface is brought into contact with the free end 39a of the second link 39.

When the inner end portion 48 (the other end portion) in the radial direction of the control lever 45 contacts the contact surface of the leading end 51 of the substantially L-shaped long side portion of the balance link 50 before the control lever 45 swings counterclockwise around the anchor pin 44 as shown in FIG. 3, the control lever 45 is brought into contact with a projected portion 38b projecting from the first link 38.

Referring to FIG. 4, there is given a description of the operation of the duo-servo drum brake 1 thus constructed according to this embodiment of the invention.

In order to actuate the duo-servo drum brake 1 according to this embodiment of the invention, the support shaft 40 of the shoe expanding mechanism 37 is moved closer to the backing plate 43 by operating the brake cable, for example. Then the distance between both free ends 38a, 39a of the shoe expanding mechanism 37 is widened and the primary and secondary shoes 2, 3 are pressed against the drum, whereby braking the rotating drum is performed.

When the outer end portion 46 of the control lever 45 radially receives the counter braking force B acting on the secondary shoe 3, on the other hand, the control force C resulting from multiplying the counter braking force B by the lever ratio (L1/L2) of the control lever 45 is produced in the inner end portion 48 thereof, whereby the control lever 45 moves and presses the balance link 50 toward the secondary shoe 3.

The distance between the contact point of the balance link 50 with the other end 48 of the control lever 45 and the support shaft 49 is set equal to L3 the distance between the contact point thereof with the free end 39a of the second link 39 and the support shaft 49.

When the control force C received from the control lever 45 is smaller than the pressing force C received from second link 39, the balance link 50 almost hardly swings clockwise around the support shaft 49 as shown in FIG. 4. The control force C appears to act as what pushes the free end 39a and also what resists against the force applied to the support shaft 40 so as to widen the space between both free ends 38a, 39a. In order to maintain that width, it is necessary to increase the force applied to the support shaft 40 accordingly.

Notwithstanding the fact that the force of operating the expanding mechanism is constant, the braking force derived from the primary and secondary shoes 2, 3 may increase and result in causing the brake operating force to exceed over a predetermined value because of servo action. Then the counter braking force B acting on the secondary shoe 3 is increased. Therefore, the control force C applied by the control lever 45 to the balance link 50 becomes well over the pressing force D applied by the second link 39 to the balance link 50.

Then the balance link 50 is pressed by the control lever 45 and swings around the support shaft 49 clockwise and the other end portion 48 of the control lever 45 engages with the projected portion 38b of the first link 38, whereby the counter braking force causes the control force C to act on the first link 38.

In consequence, since the pressing force A with which the first link 38 is pressing the primary shoe 2 against the drum is reduced by the control force C with which the control lever 45 acts on the first link 38, the braking force derived from the primary shoe 2 is also reduced. As the braking force derived from the primary shoe 2 decreases, the counter braking force acting on the primary shoe 2 is also reduced and the pressing force used to press the rearward side of the secondary shoe 3 against the drum is simultaneously reduced, which results in decreasing the overall braking force of the duo-servo drum brake 1 is reduced according to this embodiment of the invention.

More specifically, the counter force of the brake operating force increases as the braking force increases despite the fact that the force of operating the shoe expanding mechanism 37 is constant in the duo-servo drum brake 1 according to this embodiment of the invention, whereby the brake can be made readily responsive to the brake operating force itself. When the braking force exceeds the predetermined value because of servo action, further, the other end portion 48 of the control lever 45 causes the control force C to act on the first link 38, and the pressing force A applied by the first link 38 to the primary shoe 2 is reduced, so that stable braking force is obtainable as a sharp increase in the braking force is automatically suppressed.

The intensity of the control force C with which the control lever 45 acts on the balance link 50 can be adjusted by properly varying the value of the lever ratio (L1/L2) of the control lever 45.

According to the aforesaid embodiment of the invention, for example, though the distance between the contact point of the balance link 50 with the control lever 45 and the support shaft 49 is set equal to L3 the distance between the contact point thereof with the free end 39a of the second link 39 and the support shaft 49, the distance may needless to say be properly adjustable.

When the brake operating force on the shoe expanding mechanism 37 is released, the control lever 45 and the balance link 50 are naturally returned to the initial position by returning means such as coil springs (not shown).

As is apparent from the description given above, the invention is arranged so that part of the counter braking force acting on the secondary shoe is taken out and caused to reversely act on the strut for pressing the primary shoe against the brake drum and when the braking force is increased, the pressing force with which the strut is pressing the primary shoe is drastically reduced and when the braking force is decreased, the pressing force with which the strut is pressing the primary shoe is slightly reduced. Thus, a duo-servo drum brake offering stable braking force can be provided.

As is apparent from the description given above, the invention is arranged so that part of the counter braking force acting on the secondary shoe is taken out and caused to reversely act on the first link for pressing the primary shoe against the brake drum so as to automatically reduce the pressing force applied by the first link to press the primary shoe against the drum. Thus, a duo-servo drum brake offering stable braking force can be provided.

What is claimed is:

1. A duo-servo drum brake comprising: a primary shoe and a secondary shoe which are disposed opposite to each other inside a brake drum, counter braking force acting on the primary shoe being used for pressing the secondary shoe against the brake drum; and an anchor pin disposed forward further than the secondary shoe in the direction in which the brake drum is rotated forward and used for receiving the counter braking force, further including:

a shoe expanding mechanism having a first link for pressing the primary shoe against the brake drum and a second link for pressing the secondary shoe synchronously when the first link presses the primary shoe;

a control lever which is held around the anchor pin and when its end portion on one side receives counter braking force acting on the secondary shoe, its end portion on the other side is capable of swinging around the anchor pin in the direction of the secondary shoe;

a balance link which is pivotally supported with the secondary shoe in a manner capable of swinging, has a contact surface in one end portion with the other end portion of the control lever and a contact surface in the other end portion with a pressing portion of the second link, and swings when the pressing force received with the contact surface in the one end portion from the control lever exceeds the pressing force received with the contact surface in the other end portion from the second link; and a projected portion which is provided for the first link and when the other end portion of the control lever is displaced toward the secondary shoe after swinging the balance link, engages with the secondary shoe in order to reduce the pressing force of the first link.

* * * * *